(12) United States Patent
Mikita et al.

(10) Patent No.: US 8,808,653 B2
(45) Date of Patent: Aug. 19, 2014

(54) CATALYST FOR PURIFYING EXHAUST GAS

(75) Inventors: Kosuke Mikita, Himeji (JP); Takahiro Ikegami, Himeji (JP); Masanori Ikeda, Himeji (JP); Hideki Goto, Himeji (JP)

(73) Assignees: Umicore Shokubai Japan Co., Ltd., Tokyo (JP); Umicore Shokubai USA Inc., Auburn Hills, MI (US)

( * ) Notice: Subject to any disclaimer, the term of this patent is extended or adjusted under 35 U.S.C. 154(b) by 80 days.

(21) Appl. No.: 13/254,953

(22) PCT Filed: Mar. 4, 2010

(86) PCT No.: PCT/JP2010/053554
§ 371 (c)(1),
(2), (4) Date: Sep. 6, 2011

(87) PCT Pub. No.: WO2010/101219
PCT Pub. Date: Sep. 10, 2010

(65) Prior Publication Data
US 2012/0027654 A1    Feb. 2, 2012

(30) Foreign Application Priority Data
Mar. 6, 2009   (JP) ................... 2009-053916

(51) Int. Cl.
| | | |
|---|---|---|
| *B01D 53/56* | (2006.01) | |
| *B01D 53/94* | (2006.01) | |
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01J 23/00* | (2006.01) | |
| *B01J 23/10* | (2006.01) | |
| *B01J 23/40* | (2006.01) | |
| *B01J 23/42* | (2006.01) | |
| *B01J 23/70* | (2006.01) | |
| *B01J 23/74* | (2006.01) | |
| *B01J 23/83* | (2006.01) | |
| *B01J 37/02* | (2006.01) | |
| *F01N 3/10* | (2006.01) | |
| *F01N 3/08* | (2006.01) | |
| *B01J 23/89* | (2006.01) | |

(52) U.S. Cl.
CPC .... *B01D 53/945* (2013.01); *B01D 2255/20715* (2013.01); *B01D 2255/908* (2013.01); *B01D 2255/2042* (2013.01); *B01D 2255/1021* (2013.01); *B01D 2255/1023* (2013.01); *B01D 2255/9022* (2013.01); *F01N 2370/02* (2013.01); *B01D 2255/20738* (2013.01); *B01J 2523/00* (2013.01); *B01J 23/83* (2013.01); *B01D 2255/1025* (2013.01); *B01J 37/0244* (2013.01); *B01D 2255/407* (2013.01); *B01D 2255/2065* (2013.01); *B01D 2255/2063* (2013.01); *B01D 2255/2061* (2013.01); *F01N 3/101* (2013.01); *F01N 3/0864* (2013.01); *B01J 23/002* (2013.01); *B01J 23/894* (2013.01); *Y02T 10/22* (2013.01)
USPC ........ 423/213.5; 502/302; 502/304; 502/326; 502/338; 502/349

(58) Field of Classification Search
USPC ........ 502/302, 304, 326, 338, 349; 423/213.5
See application file for complete search history.

(56) References Cited

U.S. PATENT DOCUMENTS

| | | | | |
|---|---|---|---|---|
| 5,120,695 | A  * | 6/1992 | Blumrich et al. | 502/78 |
| 5,580,536 | A  * | 12/1996 | Yao et al. | 423/263 |
| 6,585,944 | B1 | 7/2003 | Nunan et al. | |
| 7,396,516 | B2 * | 7/2008 | Fisher et al. | 423/213.2 |
| 7,713,908 | B2 * | 5/2010 | Yamamoto et al. | 502/300 |
| 7,915,195 | B2 * | 3/2011 | Takeshima et al. | 502/304 |
| 2007/0215009 | A1 * | 9/2007 | Shimazu et al. | 106/600 |
| 2009/0325793 | A1 | 12/2009 | Takeshima et al. | |
| 2011/0020201 | A1 * | 1/2011 | Luo et al. | 423/213.5 |

FOREIGN PATENT DOCUMENTS

| | | |
|---|---|---|
| JP | 59-082946 | 5/1984 |
| JP | 06-296869 | 10/1994 |
| JP | 10-216509 | 8/1998 |
| JP | 2002-336703 | 11/2002 |
| JP | 2002336703 A * | 11/2002 |
| JP | 2003-033669 | 2/2003 |
| JP | 2005-125317 | 5/2005 |
| JP | 2005-349383 | 12/2005 |
| WO | 2008/007811 | 1/2008 |

OTHER PUBLICATIONS

Panayiota S. Lambrou and Angelos M. Efstathiou. "The effects of Fe on the oxygen storage and release properties of model Pd-Rh/$CeO_2$-$Al_2O_3$ three-way catalyst." Journal of Catalysis, Jun. 10, 2006, vol. 240, No. 2, p. 182-193.

* cited by examiner

*Primary Examiner* — Anthony J Zimmer
(74) *Attorney, Agent, or Firm* — Cesari and McKenna, LLP (57) ABSTRACT

PROBLEM
The present invention is directed to provide a catalyst for purifying exhaust gas capable of maintaining a superior catalytic performance even when the catalyst is exposed to an exhaust gas at a high temperature of 800° C. or higher.
SOLUTION
The catalyst for purifying exhaust gas of the present invention comprises a catalytically active component containing a noble metal and a promoter containing an oxygen storage material both being supported on a carrier. The oxygen storage material comprises cerium, zirconium, and iron, and content of iron in the oxygen storage material is 0.01% by mass or more and less than 0.70% by mass ($Fe_2O_3$ conversion) relative to the total mass of the oxygen storage material. And the oxygen storage material is (a) a complex oxide or a solid solution of iron and a metal comprising cerium and zirconium; or (b) an iron is supported on a complex oxide or a solid solution of a metal comprising cerium and zirconium.

14 Claims, 5 Drawing Sheets

CATALYST FOR PURIFYING EXHAUST GAS

CROSS REFERENCE TO RELATED APPLICATIONS

This application is a National Stage of International Application No. PCT/JP2010/053554, filed on Mar. 4, 2010, which claims priority to Japanese Application No. 2009-053916 filed Mar. 6, 2009. The contents of the prior applications are incorporated herein by reference in their entirety.

TECHNICAL FIELD

The present invention relates to a catalyst for purifying exhaust gas. In particular, the present invention relates to a catalyst for purifying exhaust gas capable of maintaining superior catalytic performance even when the catalyst is exposed to a high temperature exhaust gas.

BACKGROUND ART

Up to now, a number of technologies relating to exhaust gas purification have been proposed. In particular, there have been many proposals relating to treatment technologies for exhaust gases generated from internal combustion engines such as gasoline engine, diesel engine, and an engine using a bio-based fuel or a fuel including methanol.

As a catalyst for purifying an exhaust gas generated from internal combustion engine, a three-way catalyst which removes concurrently nitrogen oxide (hereinafter, also referred to as "NOx"), carbon monoxide (hereinafter, also referred to as "CO"), and hydrocarbon (hereinafter, also referred to as "HC"), a catalyst which removes concurrently NOx, CO, and HC in an oxygen-excess state due to combustion of fuel-lean, and the like have been proposed. That is, these are a type of catalysts having functions to oxidize CO and HC to $CO_2$ and reduce NOx to $N_2$ together. Many catalysts of this type have an Oxygen Storage Capacity (hereinafter, also referred to as "OSC") with which catalyst itself accumulates oxygen when exhaust gas is in an oxygen-excess state (oxidative atmosphere), and releases the accumulated oxygen when exhaust gas is oxygen-deficient state (reductive atmosphere). A promoter component having such OSC is referred to as oxygen storage material (hereinafter, also referred to as "OSC material"), and by using this, CO and HC can be efficiently oxidized to $CO_2$ even in an oxygen-deficient state. As an OSC material, it has been known that cerium oxide ($CeO_2$: also referred to as "ceria") and ceria-zirconia complex oxide ($CeO_2$—$ZrO_2$ complex oxide) have superior performance.

In order to improve performance and durability of the OSC material, a technology has been developed where a metal element such as iron is added to $CeO_2$, $CeO_2$—$ZrO_2$ complex oxide, and the like.

For example, Patent Literature 1 discloses an OSC material comprising besides zirconium, cerium, and a rare earth metal as a stabilizer, 0.01 to 0.25 mol % of at least one kind of metal selected from a group consisting of iron, copper, cobalt, nickel, silver, manganese, and bismuth. And, the literature describes that these metals exist as a solid solution in a crystal structure of the OSC material.

In addition, Patent Literature 2 discloses an OSC material comprising a carrier containing ceria ($CeO_2$) and iron oxide as an active species contained in said carrier. And the literature describes that the carrier containing $CeO_2$ is preferably a solid solution of $CeO_2$—$ZrO_2$. Further, the literature describes that content of iron oxide is desirably in a range of 2 to 30% by weight as $Fe_2O_3$ relative to the weight of the OSC material, and substantial OSC cannot be obtained when the content deviates from this range.

The OSC material containing cerium functions as a promoter of oxidation/reduction reaction, and in the technologies described in the above Patent Literatures 1 and 2, iron is allowed to exist in the vicinity of cerium for the purpose of facilitating this catalytic performance of cerium.

In addition, Patent Literature 3 discloses a catalyst for purifying exhaust gas where iron oxide, cerium oxide, and at least 2 kinds of noble metal elements are supported on a refractory carrier mainly composed of alumina ($Al_2O_3$). Said catalyst is characterized in that the catalyst components are supported on said refractory carrier by using aqueous solution A containing at least one kind of noble metal element compound, organic acid cerium salt, and water-soluble iron salt, and aqueous solution B containing other noble metal element compound, as an impregnating solution.

Further, Non-Patent Literature 1 discloses that in a three-way catalyst where 1% by mass of Pd—Rh is supported on 20% by mass of $CeO_2$—$Al_2O_3$, OSC is improved by adding 0.1 to 0.3% by mass of iron.

PRIOR ART TECHNOLOGY LITERATURES

Patent Literatures

Patent Literature 1: U.S. Pat. No. 6,585,944;
Patent Literature 2: JP-A-2005-125317;
Patent Literature 3: JP-A-59 (1984)-82946.

Nonpatent Literatures

Non-Patent Literature 1: Panayiota S. Lambrou and Angelos M. Efstathiou, Journal of Catalysis, V 240, No. 2, 182-193 (Jun. 10, 2006).

SUMMARY OF INVENTION

Problem to be Solved by the Invention

However, the above-described catalyst had a problem that when the OSC material was once exposed to an exhaust gas at a high temperature (800° C. or higher), OSC decreased, and as a result, the oxidation•reduction performances of the whole catalyst decreased remarkably. It was considered to be one of causes of this decrease in OSC that crystal structure of the matrix constructing the OSC material was destroyed by a high temperature exhaust gas, resulting in decrease of specific surface area.

In particular, oxygen concentration in exhaust gas varies depending on operational situation of engine, and when once OSC is decreased by being exposed to a high temperature exhaust gas as described above, performance for purifying exhaust gas decreases remarkably.

Therefore, the present invention is directed to provide a catalyst for purifying exhaust gas capable of maintaining superior catalyst performance even when the catalyst is exposed to an exhaust gas at a high temperature of 800° C. or higher.

Means for Solving the Problem

The inventors of the present invention have intensively studied to solve the above-described problem. In that process, the inventors have found that a catalyst having noticeable exhaust gas purifying performance even after being exposed at a high temperature can be obtained by making a content of iron in an OSC material containing cerium and zirconium 0.01% by mass or more and less than 0.70% by mass, and thus completed the present invention.

That is, the catalyst for purifying exhaust gas of the present invention comprises a catalytically active component containing a noble metal and a promoter component containing oxygen storage material both being supported on a carrier. The oxygen storage material comprises cerium, zirconium and iron, and content of iron in the oxygen storage material is 0.01% by mass or more and less than 0.70% by mass ($Fe_2O_3$ conversion) relative to the total mass of the oxygen storage material. In addition, the oxygen storage material is (a) a complex oxide or a solid solution of iron and metals containing cerium and zirconium; or (b) an iron is supported on a complex oxide or a solid solution of a metal comprising cerium and zirconium.

Effect of the Invention

The catalyst for purifying exhaust gas of the present invention can maintain a superior catalyst performance even when the catalyst is exposed to an exhaust gas at a high temperature of 800° C. or higher.

MODES FOR CARRYING OUT THE INVENTION

Hereinafter, preferable embodiments of the present invention will be explained. The catalyst for purifying exhaust gas of the present embodiment (hereinafter, also simply referred to as "catalyst") comprises a catalytically active component containing a noble metal and a promoter containing an oxygen storage material both being supported on a carrier. The oxygen storage material comprises cerium, zirconium, and iron, and content of iron in the oxygen storage material is 0.01% by mass or more and less than 0.70% by mass ($Fe_2O_3$ conversion) relative to the total mass of the oxygen storage material. And, the oxygen storage material is (a) a complex oxide or a solid solution of iron and metals containing cerium and zirconium (hereinafter, "complex oxide or solid solution" is also simply referred to as "complex oxide and the like"); or (b) iron is supported on a complex oxide or a solid solution of a metal comprising cerium and zirconium. Hereinafter, this embodiment will be explained referring to the drawings, however, technical scope of the present invention should be determined based on the descriptions in claims, and should not be limited only to the following embodiments. It should be noted that dimensional scales of the drawings have been emphasized for convenience of explanation, and sometimes are different from the actual ratios.

<Catalyst for Purifying Exhaust Gas>

Figure 1:
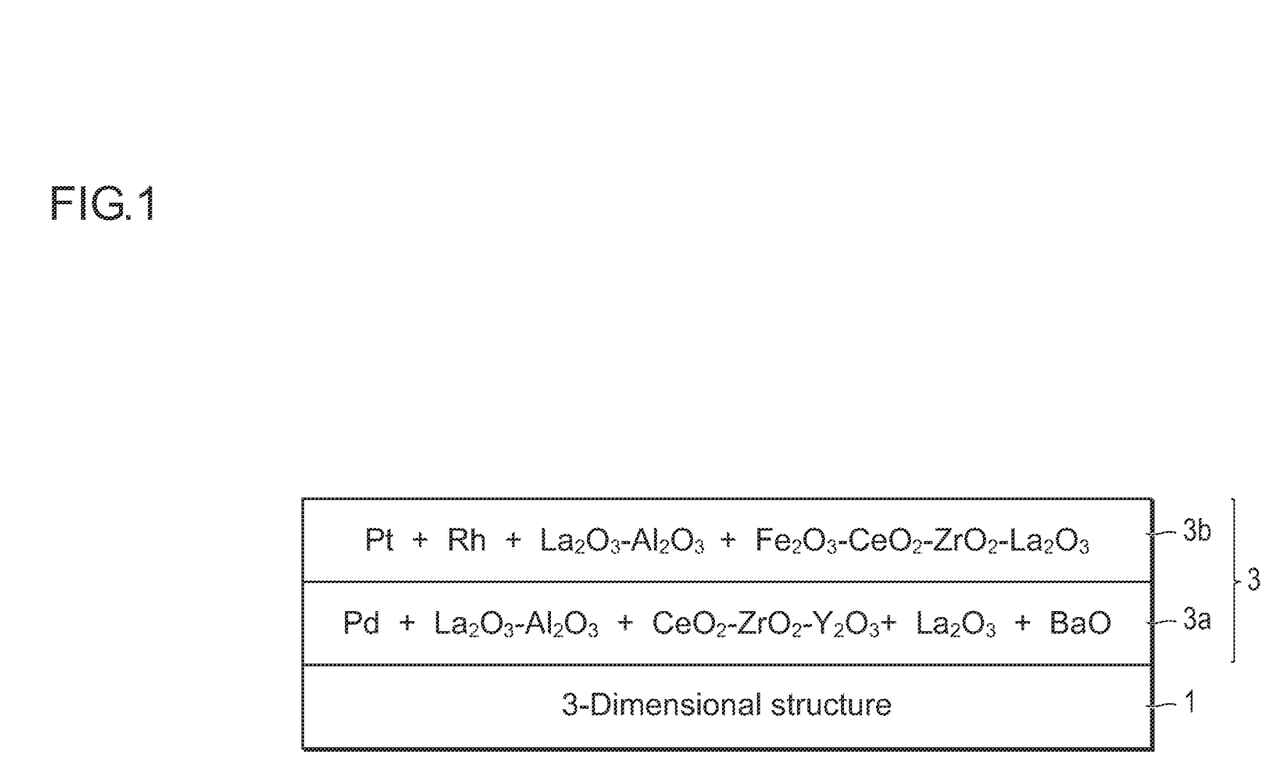
FIG. 1 is a cross-sectional view schematically showing a part of the laminated structure of the catalyst layer in the catalyst for purifying exhaust gas of one embodiment of the present invention.

FIG. 1 is a cross-sectional view schematically showing a part of the laminated structure of the catalyst layer in the catalyst for purifying exhaust gas in one embodiment of the present invention. As shown in FIG. 1, in this embodiment, catalyst layer 3 is formed on carrier 1. Catalyst layer 3 has a laminated structure of lower layer 3a and upper layer 3b. Carrier 1 consists of a 3-dimensional structure (not shown), and in FIG. 1, only a part of the surface thereof is shown. Lower layer 3a comprises Pd of a noble metal, as a catalytically active component, $La_2O_3$, BaO, and $CeO_2$—$ZrO_2$—$Y_2O_3$ of OSC material as promoter components, and $La_3O_3$—$Al_2O_3$ as a refractory inorganic oxide. In addition, upper layer 3b comprises Pt and Rh of noble metals as catalytically active components, $Fe_2O_3$—$CeO_2$—$ZrO_2$—$La_2O_3$ of OSC material as a promoter component, and $La_3O_3$—$Al_2O_3$ as a refractory inorganic oxide. Hereinafter, each constitutional element included in the catalyst for purifying exhaust gas of the present embodiment will be explained.

[Catalytically Active Component]

The catalytically active component is a component which directly catalyzes a chemical reaction (oxidation•reduction reaction) to purify an exhaust gas. The catalyst for purifying exhaust gas of the present embodiment essentially comprises a noble metal as a catalytically active component.

Kind of the noble metal to be used as the catalytically active component is not particularly limited, but preferably the noble metal comprises at least one kind of metal selected from a group consisting of platinum (Pt), palladium (Pd), and rhodium (Rh). More preferably, platinum and rhodium, palladium and rhodium, or palladium, rhodium and platinum, and further more preferably palladium and rhodium are used in combination. Amount of these noble metals to be used is also not particularly limited, but preferably 0.1 to 15 g, and more preferably 0.5 to 5 g per 1 liter of catalyst. In more detail, amount of platinum to be used is preferably 0.01 to 5 g, and more preferably 0.5 to 3 g per 1 liter of catalyst, amount of palladium to be used is preferably 0.5 to 10 g, and more preferably 0.5 to 3 g per 1 liter of catalyst, amount of rhodium to be used is preferably 0.01 to 3 g, and more preferably 0.03 to 1.5 g per 1 liter of catalyst.

Raw material of the noble metal is not particularly limited, but preferably a water-soluble salt of a noble metal is used. Platinum source includes a compound such as platinum nitrate, dinitrodiammineplatinum, platinum chloride, tetraammineplatinum, bis(ethanolamine)platinum, bis(acetylacetonate)platinum. Palladium source includes palladium nitrate, palladium chloride, palladium acetate, tetraamminepalladium, and the like. Rhodium source includes rhodium nitrate, rhodium chloride, rhodium acetate, hexaamminerhodium, and the like. As for these water-soluble salts of noble metals, one kind may be used alone or two or more kinds may be used in combination.

Existence form of the catalytically active component is not particularly limited. For example, it may be a form where the catalytically active component is dispersed alone in the catalyst layer formed on the surface of the carrier, or a form where the catalytically active component supported on a promoter component or a refractory inorganic oxide described later is dispersed in the catalyst layer. Among these, a form where the catalytically active component is supported on the surface of the OSC material relevant to this embodiment as described later is preferable. By supporting the noble metal on the OSC material, the oxygen stored in•released from the OSC material may be efficiently used for oxidation•reduction reaction which is catalyzed by these noble metals.

[Promoter Component]

The promoter component is a component having a function to assist the catalytic action of the above-described catalytically active component. The promoter component includes, for example, an OSC material to promote oxidation reaction by storing•releasing oxygen contained in an exhaust gas, HC adsorbent material, NOx adsorbent material, and the like. The catalyst of the present embodiment essentially comprises an OSC material, and may also comprise other component if necessary.

(Oxygen Storage Material)

The OSC material has a function to store oxygen under the oxidative atmosphere and release the stored oxygen under the reductive atmosphere. The OSC material relevant to this embodiment essentially comprises cerium, zirconium, and-iron. Form of the OSC material is divided broadly to the following two groups. Form (a) is a complex oxide or a solid solution of iron and metals containing cerium and zirconium. Form (b) is a form where an iron is supported on the surface of a complex oxide or a solid solution of metal containing cerium and zirconium.

Firstly, form (a) which is a complex oxide of iron and metals containing cerium and zirconium and the like, will be explained. Said form essentially comprises three components of cerium, zirconium and iron, but may comprise a metal other than cerium, zirconium and iron (hereinafter, also referred to as "metal A").

The metal A is not particularly limited so long as it is capable of forming a complex oxide and the like together with cerium, zirconium and iron. Specific example of the metal A includes rare earth metal (however, cerium is excluded; hereinafter the same) such as scandium (Sc), yttrium (Y), lanthanum (La), praseodymium (Pr), and neodymium (Nd), transition metal (however, iron and zirconium are excluded; hereinafter the same) such as cobalt (Co) and nickel (Ni); alkaline earth metal such as magnesium (Mg) and barium (Ba); and the like. One kind of these metals can be used alone, or two or more kinds can be used in combination. Among these metals, from the viewpoint to improve further heat resistance of the OSC material, preferably yttrium and/or lanthanum is contained, and more preferably lanthanum is contained. When rare earth metal is contained as the metal A, amount of the rare earth metal to be used is preferably 0.1 to 30% by mass, more preferably 1 to 20% by mass in oxide equivalent relative to the total mass of the OSC material.

Next, form (b) where an iron is supported on the surface of a complex oxide or a solid solution of metals containing cerium and zirconium, will be explained. In form (b), "a complex oxide or a solid solution of metals containing cerium and zirconium" is different from "a complex oxide of iron and metals containing cerium and zirconium" of the above-described form (a) only in the point that iron is not an essential component. Therefore, as the complex oxide and the like of form (b), obviously a complex oxide containing iron and the like of form (a) may be used. In addition, a complex oxide and the like of form (b) may contain a metal other than cerium and zirconium, the similar one to the above-described metal A can be used.

In form (b), an iron is supported on the surface of a complex oxide and the like of metals containing cerium and zirconium. Iron to be supported exists usually in a state of iron oxide. Form of iron oxide is not particularly limited, and may be any one of iron oxide (FeO), ferric oxide ($Fe_2O_3$), or magnetite ($Fe_3O_4$). As described above, even if iron is not incorporated in the complex oxide and the like, if iron is in contact with the surface of the complex oxide and the like, the effect of the present invention can be obtained.

In the OSC material of either form (a) or form (b) described above, mass ratio of cerium and zirconium contained in the complex oxide and the like is preferably 10:1 to 1:50, and more preferably 5:1 to 1:40 in oxide equivalent. In addition, mass ratio of cerium and metal A contained in the complex oxide or the solid solution is preferably 6:1 to 1:12, and more preferably 4:1 to 1:8 as in oxide equivalent. By containing such amount of metal A, a complex oxide and the like having superior heat resistance and capable of maintaining superior catalyst performance even when the catalyst is exposed at a high temperature of 800° C. or higher are formed.

The OSC material relevant to the present embodiment essentially comprises iron. In the OSC material in either form of the above-described (a) or (b), content of iron contained in the OSC material is 0.01% by mass or more and less than 0.70% by mass ($Fe_2O_3$ conversion) relative to the total mass of the OSC material. Lower limit of iron content is preferably 0.05% by mass or more, and more preferably 0.1% by mass or more. On the other hand, upper limit of iron content is preferably 0.65% by mass or less, and more preferably 0.50% by mass or less. By containing such amount of iron in the OSC material, influence of decrease in specific surface area of the OSC material can be reduced to the minimum level, and hence superior OSC can be maintained even when exposed to a high temperature (800° C.). Therefore, by using said OSC material for the catalyst for purifying exhaust gas of the present embodiment, a superior purifying performance can be exerted to an exhaust gas with varying oxygen concentration, even after being exposed to a high temperature (800° C.). In addition, by containing such amount of iron, OSC of the OSC material itself and performance of the catalytically active component can be improved, and in particular, superior purifying performance for exhaust gas can be exerted even when temperature of exhaust gas is low. Further, durability of the OSC material can be improved. Due to the effects as described above, it becomes possible to reduce amount of scarce material such as rare earth metal and noble metal to be used, and reduce cost of the catalyst drastically.

It should be noted that of course the catalyst for purifying exhaust gas of the present embodiment may be the one which comprises an OSC material not containing cerium, zirconium, or iron other than the OSC material containing cerium, zirconium, and iron. Provided that, the above-described content of iron contained in the OSC material is a value based on the total mass of the OSC material containing cerium, zirconium, and iron, and is not a value based on the total mass of all OSC materials contained in the catalyst for purifying exhaust gas.

Shape and the like of the OSC material relevant to the present embodiment are not particularly limited, so long as a desired OSC can be obtained. Shape of the OSC material can be, for example, granular, particulate, powdery, cylindrical, conical, prismatic, cubic, pyramidal, irregular form, or the like. Preferably shape of the OSC material is granular, particulate, and powdery form. When said shape is granular, particulate, or powdery form, average particle size of the OSC material is not particularly limited, but it is, for example, in a range of 1.0 to 100 μm, and preferably 1.0 to 20.0 μm. It should be noted that "average particle size" of the OSC material in the present specification can be measured by an average value of particle size of the OSC material to be measured by a known method such as classification.

In addition, BET specific surface area of the OSC material is not particularly limited, so long as oxygen in an exhaust gas can be sufficiently stored•released, but from the viewpoint of OSC, it is preferably 10 to 300 $m^2/g$, and more preferably 50 to 200 $m^2/g$.

The OSC material relevant to this embodiment can be produced by appropriately referring to the conventionally known method. When the OSC material contains a complex oxide, for example, a method where aqueous solutions of nitrate salt of cerium, zirconium, and iron are mixed together, and nitrate salts are converted to hydroxides by coprecipitating with ammonia or the like, then filtered and dried (coprecipitation method); a method where respective oxides are pulverized, formulated, and the resultant powdery mixture is calcined (solid phase reaction method); and the like are enumerated. In these methods, usually drying conditions are for 1 to 5 hours at 50 to 200° C. in temperature, and calcining conditions are for 1 to 5 hours at 200 to 500° C. in temperature. Further, drying and calcining are preferably carried out in a flowing air.

In addition, when the OSC material contains a solid solution, the solid solution can be produced by appropriately referring to the conventionally known method. For example, respective oxides of cerium, zirconium, and iron are mixed and melt to prepare an ingot of $Fe_2O_3$—$CeO_2$—$ZrO_2$ complex oxide in a form of solid solution. By pulverizing this ingot, a solid solution having a large specific surface area can be produced.

Further, as for a method for supporting an iron, a catalytically active component, a promoter component, and the like on a complex oxide and the like, the method commonly used in this field can be used without any limitation. When iron is supported, for example, a method where a complex oxide or a solid solution is impregnated with an aqueous solution of iron nitrate salt, and then dried and calcined (impregnation method) is enumerated.

(Other Promoter Components)

The catalyst of the present embodiment may comprise a promoter component other than the above-described OSC material, if necessary. The promoter component includes rare earth metal, alkaline earth metal, and other transition metal. These metal components usually exist in the catalyst in a form of oxide thereof.

Rare earth metal (cerium is excluded) is not particularly limited, but includes, for example, scandium (Sc), yttrium (Y), lanthanum (La), praseodymium (Pr), neodymium (Nd), and the like. These rare earth metals are used usually in a form of oxide thereof. Amount of the rare earth metal (cerium is excluded) to be used is preferably 0.5 to 10 g, and more preferably 2 to 5 g per 1 liter of catalyst as in oxide equivalent.

In addition, alkaline earth metal includes magnesium (Mg) and barium (Ba), and other transition metal includes cobalt (Co), nickel (Ni), and the like.

These promoter components may be dispersed alone in the catalyst layer, or may be in a form where these promoter components are supported by the OSC material or the refractory inorganic oxide.

[Refractory Inorganic Oxide]

The catalyst for purifying exhaust gas of the present embodiment preferably contains a refractory inorganic oxide. In particular, the refractory inorganic oxide may be used as a carrier to support the above-described catalytically active component such as noble metal, rare earth metal, and other metal element. The refractory inorganic oxide is not particularly limited, so long as it is the one which is usually used as a catalyst carrier. Specifically, the refractory inorganic oxide includes aluminium oxide ($Al_2O_3$) such as $\alpha$-alumina, or activated alumina such as $\gamma$-, $\delta$-, $\eta$-, $\theta$-; silicon oxide ($SiO_2$); titanium oxide (titania) ($TiO_2$); zirconium oxide ($ZrO_2$); phosphorus pentoxide ($P_2O_5$); phosphoric acid zeolite; or complex oxide thereof, for example, alumina-titania, alumina-zirconia, and titania-zirconia. Among these, aluminium oxide, silicon oxide (silica), phosphorus oxide, titanium oxide and zirconium oxide are preferable, silicon oxide (silica) and aluminium oxide are more preferable, and powder of activated alumina is further more preferable. In this case, these refractory inorganic oxides may be used alone or two or more kinds may be used in combination. In addition, these oxides may be used in a form of oxide as described above, or a compound which is capable of forming an oxide by heating, may be used. In the latter case, hydroxide, nitrate, halide such as chloride, acetate, sulfate, carbonate, and the like of the above-described aluminium, silicon, titanium, zirconium, and phosphorus can be used.

Content of the refractory inorganic oxide contained in the catalyst of the present embodiment is usually 10 to 300 g, and preferably 50 to 150 g per 1 liter of catalyst. When content of the refractory inorganic oxide is 10 g or more, the catalytically active component such as noble metal can be sufficiently dispersed, as well as durability can be sufficiently secured. On the other hand, when the content is 300 g or less, since the catalytically active component such as noble metal can reasonably contact with exhaust gas, temperature tends to rise up and oxidation•reduction reaction may be suitably carried out.

BET specific surface area of the refractory inorganic oxide is preferably 50 to 750 $m^2/g$, and more preferably 150 to 750 $m^2/g$, from the viewpoint of supporting the catalytically active component such as noble metal. In addition, average particle size of said refractory inorganic oxide powder is preferably 0.5 to 150 μm, and more preferably 1 to 100 μm.

[Carrier]

As for the carrier to support the above-described catalytically active component and the refractory inorganic oxide, the carrier commonly used in the relevant field can be used without any limitation, but the one having 3-dimensional structure is preferably used. The carrier having 3-dimensional structure includes heat resistant carrier such as honeycomb carrier, but honeycomb structure by monolithic molding is preferable, for example, monolithic honeycomb carrier, metal honeycomb carrier, plug honeycomb carrier, and the like can be enumerated. Besides the 3-dimensional monolithic structures, pellet carrier and the like can be also enumerated.

Monolithic carrier may be the one which is commonly referred to as ceramic honeycomb carrier, and in particular, honeycomb carriers using, as a material, cordierite, mullite, $\alpha$-alumina, zirconia, titania, titanium phosphate, aluminium titanate, petalite, spodumene, aluminosilicate, magnesium silicate, and the like are preferable. Among them, the one of cordierite type is particularly preferable. Furthermore, the one having monolithic structure using oxidation-resistant and heat-resistant metal such as stainless steel and Fe—Cr—Al alloy, is used. These monolithic carriers are produced by an extrusion forming method and a method where a sheet-like element is rolled up and fixed. Shape of gas-passing-through opening thereof (cell shape) may be any one of hexagonal, quadrangular, triangular, or corrugation type. As for cell density (cell number/unit cross-sectional area), a level of 100 to 600 cells/square inch is sufficiently usable, and a level of 200 to 500 cells/square inch is preferable.

Structure of the catalyst of the present embodiment is not particularly limited, but usually the catalyst has a structure where one or more catalyst layers comprising the above-described catalytically active component or promoter component are laminated on a carrier. In the catalyst of the present embodiment, structure of the catalyst is not particularly limited, so long as at least one layer of the catalyst layer comprises the above-described OSC material, and the effect of the present invention can be achieved wherever the catalyst layer comprising said OSC material exists.

Preferable structure is a form where at least two catalyst layers are laminated on a carrier. By employing such structure, two or more different kinds of noble metals can be arranged in different layers, respectively. Thereby, it can be prevented that different kinds of noble metals react with each other to make an alloy resulting in reducing catalytic activity.

In addition, the catalyst layer comprising the OSC material relevant to this embodiment preferably comprises rhodium together with said OSC material. Thus, by arranging the OSC material relevant to this embodiment in the vicinity of rhodium having a high three-way catalytic ability, exhaust gas can be purified with high efficiency.

<Production Method for the Catalyst for Purifying Exhaust Gas>

The catalyst of the present embodiment is produced, for example, as follows. That is, a slurry of any one of the catalytically active components is, after contacted with a carrier of 3-dimensional structure, dried in air at a temperature of 50 to 300° C., and preferably 80 to 200° C. for 5 minutes to 10 hours, and preferably 5 minutes to 8 hours. After that, the catalytically active component on a carrier is calcined at a temperature of 300 to 1200° C., and preferably 400 to 500° C. for 30 minutes to 10 hours, and preferably 1 hour to 5 hours. Subsequently, any slurry of another catalytically active component is supported in the same manner, and if necessary, any slurry of another catalytically active component is further supported in the same manner, to obtain a completed catalyst.

<Method for Purifying Exhaust Gas>

The catalyst of the present embodiment is used for purification of exhaust gas from an internal combustion engine, in particular, gasoline engine. Space velocity (S.V.) in such case is 10,000 to 120,000 $h^{-1}$, and preferably 30,000 to 100,000 $h^{-1}$. In particular, the catalyst of the present embodiment is superior in A/F fluctuating absorption, and can exert a superior catalytic performance even when fluctuation range is ±1.0 or more.

In addition, temperature at an inlet part of the catalyst in accelerating is preferably 0° C. to 1200° C., more preferably 0° C. to 800° C., and further more preferably 200° C. to 800° C. In particular, the catalyst of the present embodiment can maintain a superior catalytic performance even after being exposed to such a high temperature as 800° C. or higher. Said effect becomes more remarkable when exposed to such a high temperature as 900° C. or higher. Hydrocarbon discharged from an internal combustion engine varies depending on fuel to be used, and a fuel which is applicable to MPI engine is preferable, and gasoline, E 10, E 30, E 100, and CNG are preferable. When A/F value is less than 14.7 even in the case of light oil, dimethyl ether, biodiesel and the like, the catalyst of the present embodiment is effective.

In addition, in the front-stage (inflow side) or the post-stage (outflow side) of the catalyst of the present embodiment, a similar or a different catalyst for purifying exhaust gas may be arranged.

EXAMPLES

The function effect of the present invention will be explained by means of the following Examples and Comparative Examples. However, technical scope of the present invention is not limited only to the following Examples. In the following Examples, firstly catalysts using the OSC materials where contents of iron were varied to $CeO_2$—$ZrO_2$ complex oxide, were prepared. And, after these catalysts were subjected to a durability treatment at a high temperature, sweep (Sweep) test and light-off (LO) test were carried out, and each catalytic performance was evaluated.

Preparation of Catalyst

Example 1

In order to form a lower catalyst layer, firstly palladium nitrate as a palladium source, alumina containing 3% by weight of lanthanum oxide, barium hydroxide as a barium oxide source, and $CeO_2$—$ZrO_2$—$Y_2O_3$ complex oxide [$CeO_2$:$ZrO_2$:$Y_2O_3$=10:80:10 (mass ratio)] were arranged, and each raw material was weighed so that composition after burning becomes Pd:$La_2O_3$:BaO:$La_2O_3$—$Al_2O_3$:$CeO_2$—$ZrO_2$—$Y_2O_3$=0.4:2:2:80:50 (mass ratio). And weighed respective raw materials were mixed and stirred for 1 hour, and then pulverized by wet milling, to obtain slurry I.

In addition, in order to form an upper catalyst layer, platinum nitrate as a platinum source, rhodium nitrate as a rhodium source, alumina containing 3% by weight of lanthanum, and $Fe_2O_3$—$CeO_2$—$ZrO_2$—$La_2O_3$ complex oxide [$Fe_2O_3$:$CeO_2$:$ZrO_2$:$La_2O_3$=0.1:30:59.9:10 (mass ratio)] were arranged, and each raw material was weighed so that composition after burning becomes Pt:Rh:$La_2O_3$—$Al_2O_3$:$Fe_2O_3$—$CeO_2$—$ZrO_2$—$La_2O_3$=0.15:0.15:80:40 (mass ratio). And weighed respective raw materials were mixed and stirred for 1 hour, and then pulverized by wet milling, to obtain slurry II.

Cordierite (diameter: 33 mm×length: 77 mm) having a volume of 0.066 L was impregnated with the above slurry I, and after dried at 150° C. for 10 minutes, calcined at 500° C. for 1 hour, to form catalyst layer I which corresponds to a lower layer. Amount of catalyst layer I to be supported was 134.4 g per 1 L of cordierite. Subsequently, said carrier was impregnated with the above-described slurry II, and after dried at 150° C. for 10 minutes, calcined at 500° C. for 1 hour, to form catalyst layer II which corresponds to an upper layer, and completed catalyst B. Amount of catalyst layer II to be supported was 120.3 g per 1 L of cordierite.

Example 2

Catalyst C was prepared by the same method as in Example 1, except that ratio of respective components in the $Fe_2O_3$—$CeO_2$—$ZrO_2$—$La_2O_3$ complex oxide, which was used for slurry II, was set to $Fe_2O_3$:$CeO_2$:$ZrO_2$:$La_2O_3$=0.3:30:59.7:10 (mass ratio).

Example 3

Catalyst D was prepared by the same method as in Example 1, except that ratio of respective components in the $Fe_2O_3$—$CeO_2$—$ZrO_2$—$La_2O_3$ complex oxide, which was used for slurry II, was set to $Fe_2O_3$:$CeO_2$:$ZrO_2$:$La_2O_3$=0.5:30:59.5:10 (mass ratio).

Comparative Example 1

Catalyst A was prepared by the same method as in Example 1, except that the complex oxide to be used for slurry II was changed to a $CeO_2$—$ZrO_2$—$La_2O_3$ complex oxide [$CeO_2$:$ZrO_2$:$La_2O_3$=30:60:10 (mass ratio)].

Comparative Example 2

Catalyst E was prepared by the same method as in Example 1, except that ratio of respective components in the $Fe_2O_3$—

$CeO_2$—$ZrO_2$—$La_2O_3$ complex oxide, which was used for slurry II was, set to $Fe_2O_3$:$CeO_2$:$ZrO_2$:$La_2O_3$=0.7:30:59.3:10 (mass ratio).

Comparative Example 3

Catalyst F was prepared by the same method as in Example 1, except that ratio of respective components in the $Fe_2O_3$—$CeO_2$—$ZrO_2$—$La_2O_3$ complex oxide, which was used for slurry II, was set to $Fe_2O_3$:$CeO_2$:$ZrO_2$:$La_2O_3$=3.0:30:57:10 (mass ratio).

Example 4

Catalyst G was prepared by the same method as in Example 1, except that slurry II was prepared using a $CeO_2$—$ZrO_2$—$La_2O_3$ complex oxide supporting $Fe_2O_3$ [$CeO_2$—$ZrO_2$—$La_2O_3$:$Fe_2O_3$=99.9:0.1 (mass ratio)] instead of the $Fe_2O_3$—$CeO_2$—$ZrO_2$—$La_2O_3$ complex oxide.

It should be noted that the $Fe_2O_3$ supported $CeO_2$—$ZrO_2$—$La_2O_3$ complex oxide was prepared by impregnating the $CeO_2$—$ZrO_2$—$La_2O_3$ complex oxide with an aqueous solution of iron nitrate so that an amount of $Fe_2O_3$ to be supported becomes a specified amount, then drying at 150° C. for 12 hours or more, and after that by calcining at 500° C. for 1 hour.

Example 5

Catalyst H was prepared by the same method as in Example 4, except that ratio of respective components in the $CeO_2$—$ZrO_2$—$La_2O_3$ complex oxide supporting $Fe_2O_3$, which was used for slurry II, was set to $CeO_2$—$ZrO_2$—$La_2O_3$:$Fe_2O_3$=99.5:0.5 (mass ratio).

Comparative Example 4

Catalyst I was prepared by the same method as in Example 4, except that ratio of respective components in the $CeO_2$—$ZrO_2$—$La_2O_3$ complex oxide supporting $Fe_2O_3$, which was used for slurry II, was set to $CeO_2$—$ZrO_2$—$La_2O_3$:$Fe_2O_3$=99.3:0.7 (mass ratio).

<Durability Treatment>

0.066 L (diameter: 33 mm×length: 77 mm) of prepared catalysts A to F were set in one catalytic converter and installed at a position in the downstream from an exhaust port of a 3.0 L MPI engine. After that, catalysts A to F were subjected to a durability treatment by exposing to an exhaust gas at a catalyst inlet temperature of 900° C. for 50 hours. It should be noted that the exhaust gas was allowed to flow through catalysts A to F evenly, and the exhaust gas was the one which was discharged from an engine operated in a mode periodically repeating stoichiometric (A/F=14.6), rich (A/F=12.0), and fuel cut.

Aside from this, catalysts A and G to I were subjected to the durability treatment by the same method as above.

<Evaluation Method>

[Sweep Test]

Figure 4:
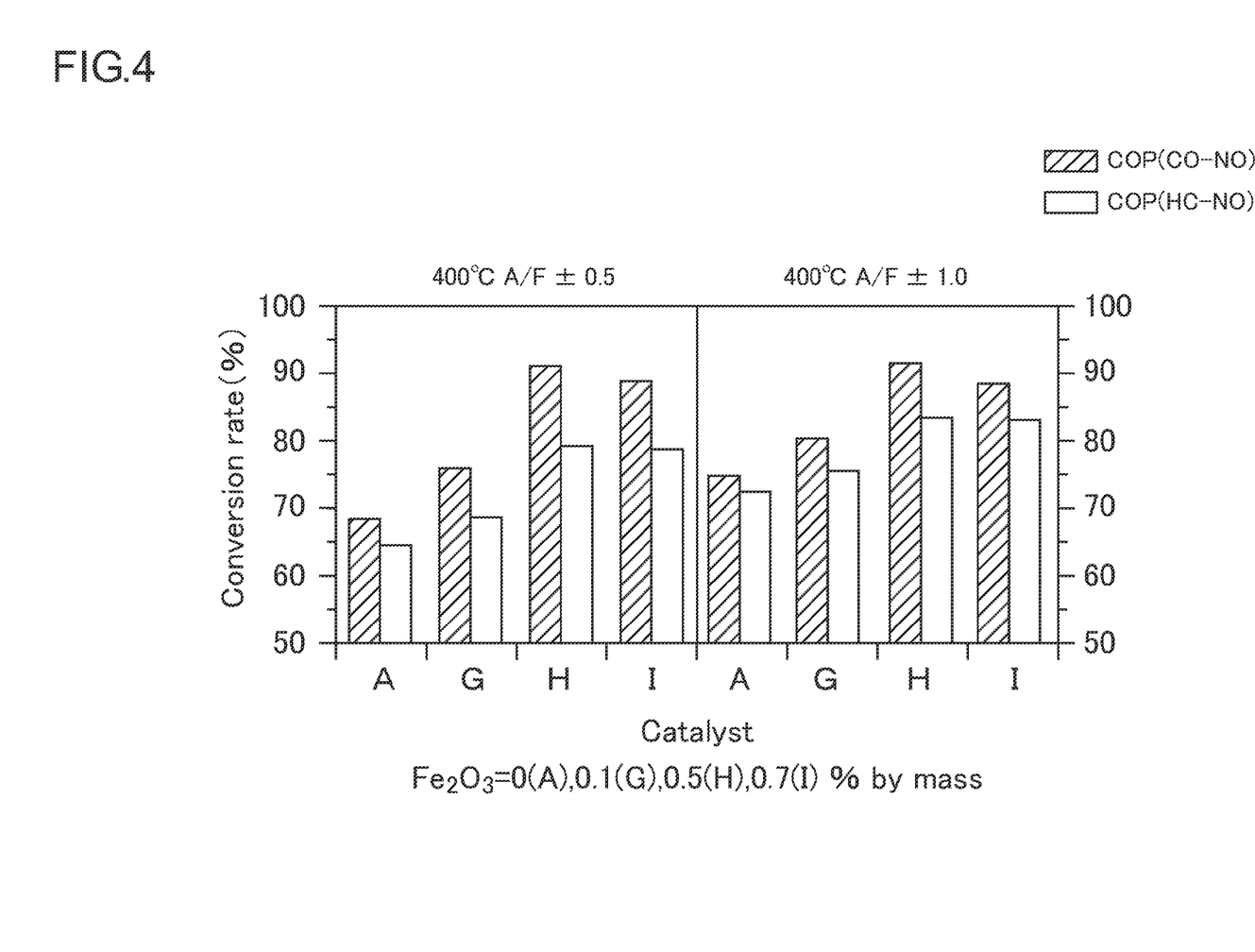
FIG. 4 is a graph showing the results of the sweep test for catalysts A and G to I.

A catalytic converter where the catalysts subjected to the durability test had been set was installed in the downstream of a 2.4 L MPI engine. Catalyst inlet temperature was fixed at 400° C. The engine was operated while A/F was varied from 14.1 to 15.1 with amplitude of ±0.5 or ±1.0 at a cycle of 1 Hz, to allow the exhaust gas to flow through the catalysts. Space velocity (SV) was set at 100000 $h^{-1}$. Concentrations of CO, HC and NOx during A/F fluctuation were recorded. A crossover point (COP; a point where CO or HC crosses over NOx) of CO—NOx and HC—NOx which could be read from a graph expressing conversion rate in vertical axis and A/F in horizontal axis was obtained. Results are shown in FIG. 2 and FIG. 4.

Figure 2:
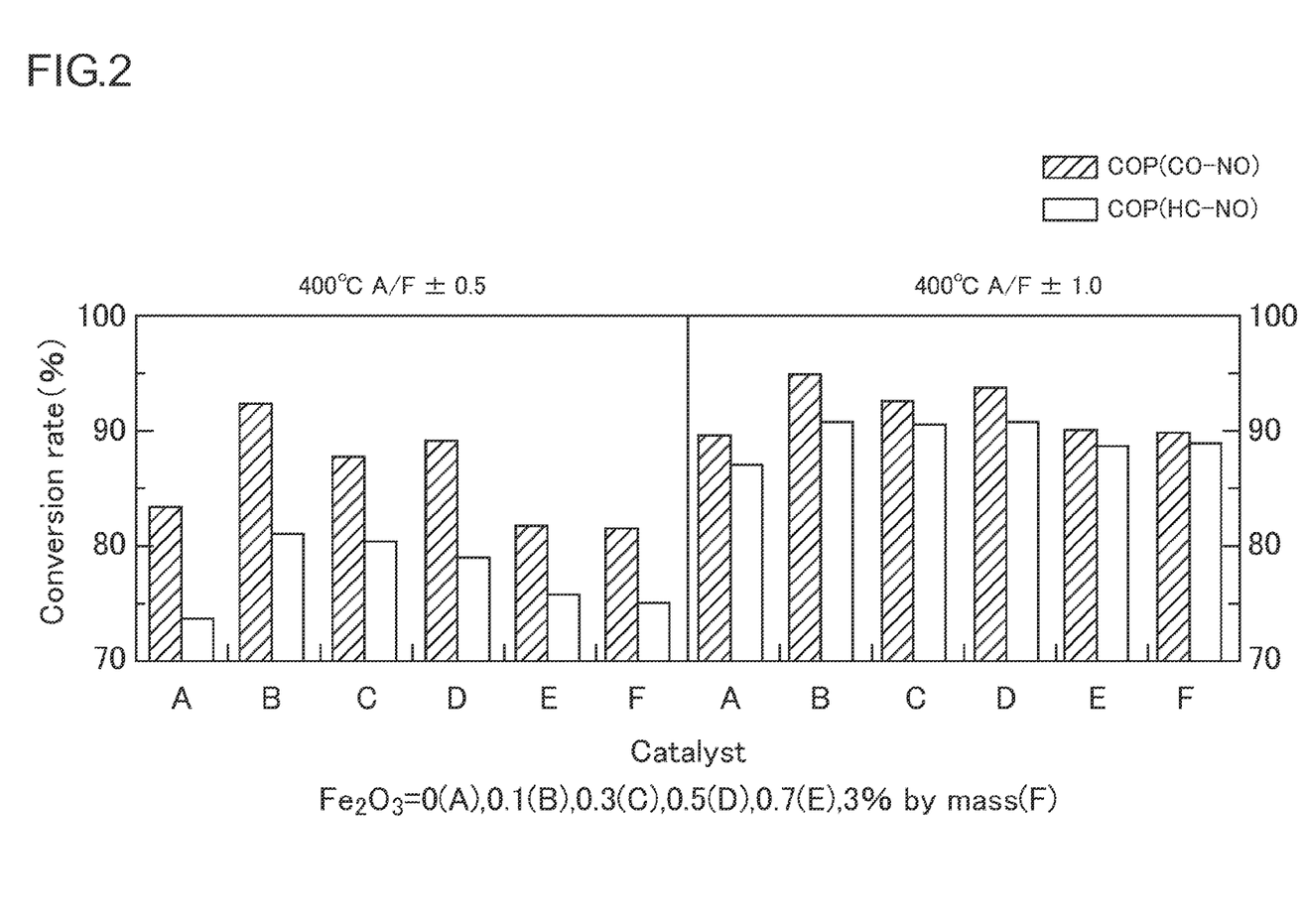
FIG. 2 is a graph showing the results of the sweep test for catalysts A to F.

According to FIG. 2, in catalysts B to D, COP of CO—NO and HC—NOx became a greater value compared with those in the cases of catalysts A, E and F. In addition, according to FIG. 4, in catalysts G to I, COP of CO—NO and HC—NOx became a greater value compared with that in the case of catalyst A. Greater value of COP means a higher catalytic performance. That is, it was shown that the catalyst of the present invention exerted a superior purification performance for the exhaust gas where oxygen concentration was varying, even after the durability treatment at 900° C.

[Light-Off (LO) Test]

Figure 5:
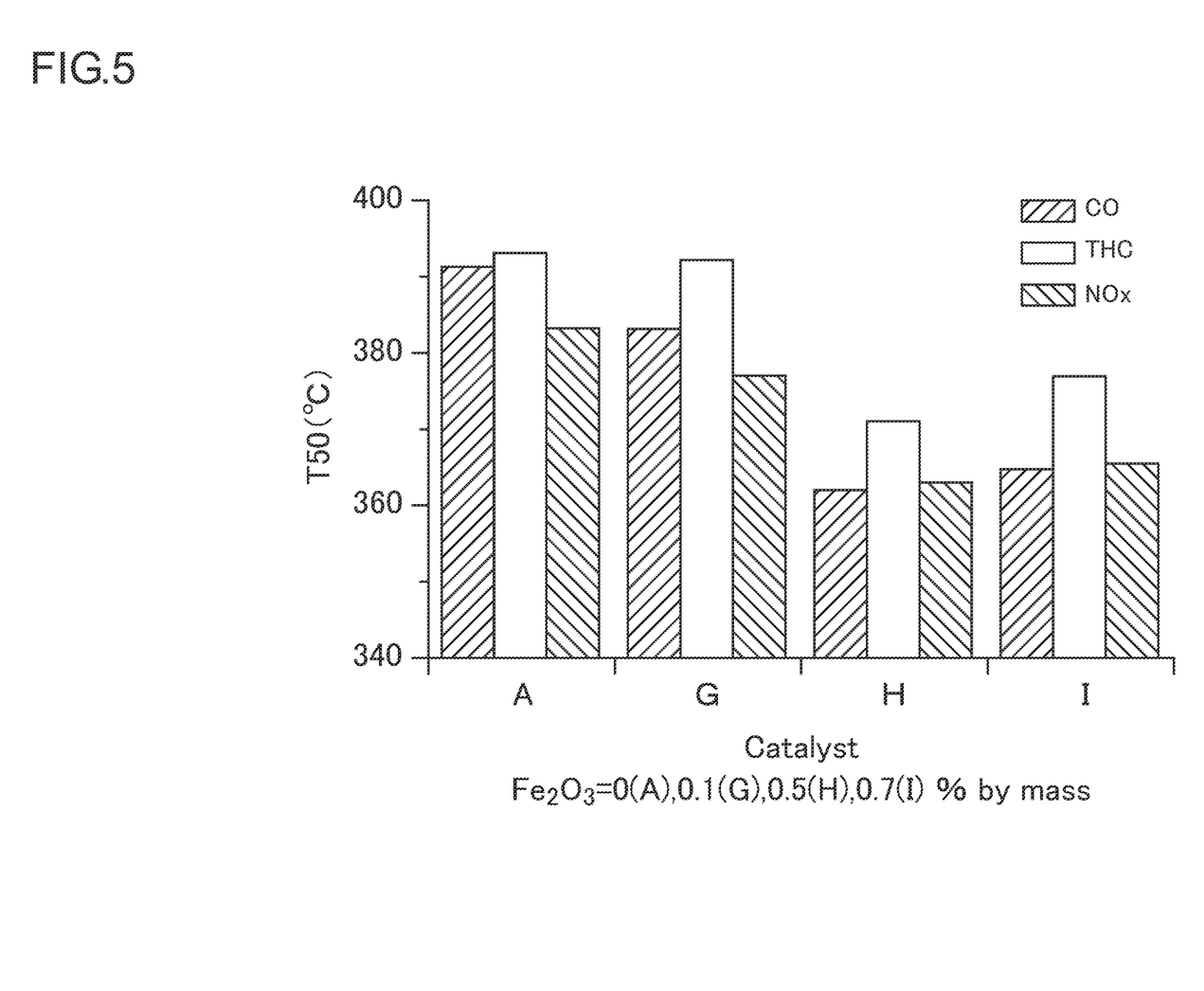
FIG. 5 is a graph showing the results of the light-off test for catalysts A and G to I.

A catalytic converter where the catalysts subjected to the durability test had been set was installed in the downstream of a 2.4 L MPI engine. The engine was operated at A/F of 14.6 with amplitude of ±0.5 at a cycle of 1 Hz, and the exhaust gas was allowed to flow through the catalysts while temperature of exhaust gas was raised. Concentrations of CO, HC and NOx were recorded during the temperature rising. 50% purification rate (T50) was obtained by reading from a graph expressing conversion rate (%) ((gas concentration in catalyst inlet−gas concentration in catalyst outlet)/gas concentration in catalyst inlet×100(%)) in vertical axis and catalyst inlet temperature in horizontal axis. Lower T50 value means a high catalytic performance. Results are shown in FIG. 3 and FIG. 5.

Figure 3:
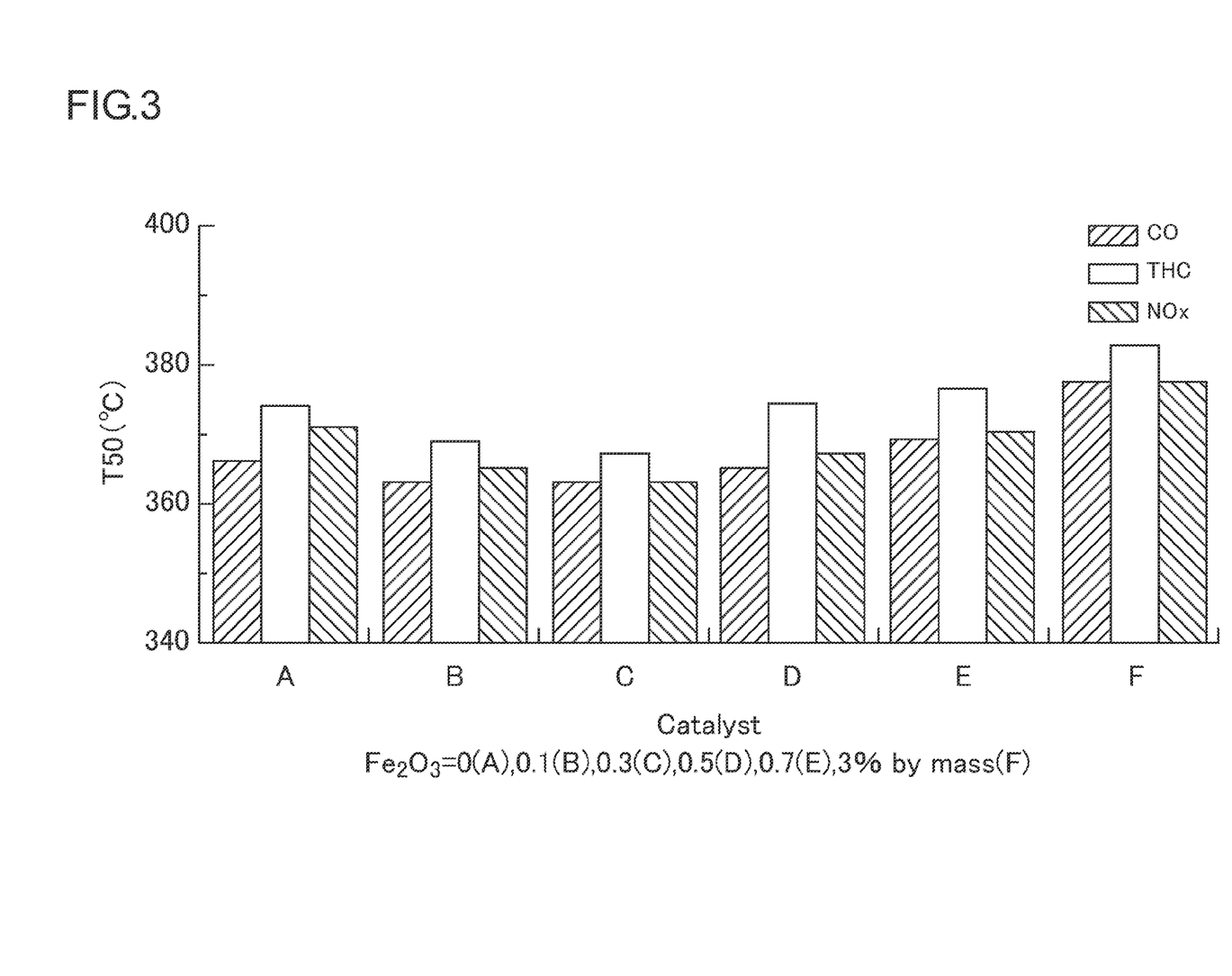
FIG. 3 is a graph showing the results of the light-off test for catalysts A to F.

According to FIG. 3, in catalysts B to D, values of T50 became smaller values compared with those in the cases of catalysts A, E and F. In addition, according to FIG. 5, in catalysts G to I, values of T50 became smaller values compared with that of catalyst A. From the above results, it was shown that the catalyst of the present invention was superior in catalytic performance under the low temperature condition, even after the durability treatment at 900° C.

DESCRIPTION OF REFERENCE NUMERALS

1: Carrier;
3: Catalyst layer;
3a: Upper layer;
3b: Lower layer.

The invention claimed is:

1. A catalyst for purifying exhaust gas comprising at least two catalyst layers laminated on a carrier, at least one of the catalyst layers having a catalytically active component containing a noble metal and also having a promoter component containing an oxygen storage material, wherein:
   the oxygen storage material comprises cerium, zirconium and iron;
   the content of iron in the oxygen storage material is 0.01% by mass or more and less than 0.70% by mass (calculated as $Fe_2O_3$) relative to the total mass of the oxygen storage material; and
   the oxygen storage material is
   (a) a complex oxide or a solid solution of iron, cerium, and zirconium; or
   (b) an iron supported on the surface of a complex oxide or a solid solution of cerium and zirconium; and wherein different noble metals are arranged in different layers of the at least two catalyst layers.

2. The catalyst for purifying exhaust gas according to claim 1, wherein the oxygen storage material further comprises at least a metal selected from the group consisting of lanthanum, yttrium, neodymium, and praseodymium.

3. The catalyst for purifying exhaust gas according to claim 1, wherein the noble metal comprises at least a metal selected from the group consisting of platinum, palladium, and rhodium.

4. The catalyst for purifying exhaust gas according to claim 3, wherein the oxygen storage material exists in a rhodium-containing layer among the catalyst layers.

5. The catalyst for purifying exhaust gas according to claim 1, wherein the carrier has a 3-dimensional structure.

6. The catalyst for purifying exhaust gas according to claim 2, wherein the noble metal comprises at least one metal selected from a group consisting of platinum, palladium, and rhodium.

7. The catalyst for purifying exhaust gas according to claim 6, wherein the oxygen storage material exists in a rhodium-containing layer among the catalyst layers.

8. The catalyst for purifying exhaust gas according to claim 2, wherein the carrier has a 3-dimensional structure.

9. The catalyst for purifying exhaust gas according to claim 3, wherein the carrier has a 3-dimensional structure.

10. The catalyst for purifying exhaust gas according to claim 7, wherein the carrier has a 3-dimensional structure.

11. The catalyst for purifying exhaust gas according to claim 4, wherein the carrier has a 3-dimensional structure.

12. The catalyst for purifying exhaust gas according to claim 6, wherein the carrier has a 3-dimensional structure.

13. A method for purifying exhaust gas comprising a step where the catalyst for purifying exhaust gas according to claim 1 is exposed to an exhaust gas discharged from an internal combustion engine.

14. The method for purifying exhaust gas according to claim 13 comprising:
- a step where the catalyst for purifying exhaust gas is exposed to an exhaust gas whose temperature is 800° C. or higher and 1000° C. or lower, and an air/fuel ratio is 10 or more; and after that
- a step where said catalyst for purifying exhaust gas is exposed to an exhaust gas whose temperature is 0° C. or higher and 800° C. or lower.

\* \* \* \* \*